Inventor:
Alexander J. Yerman,
by Donald R Campbell
His Attorney.

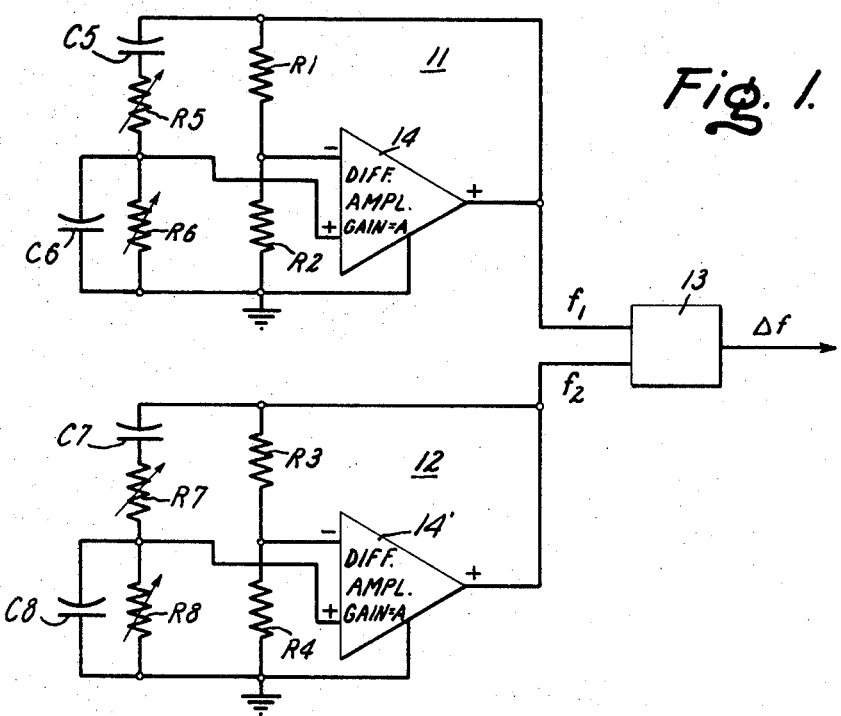
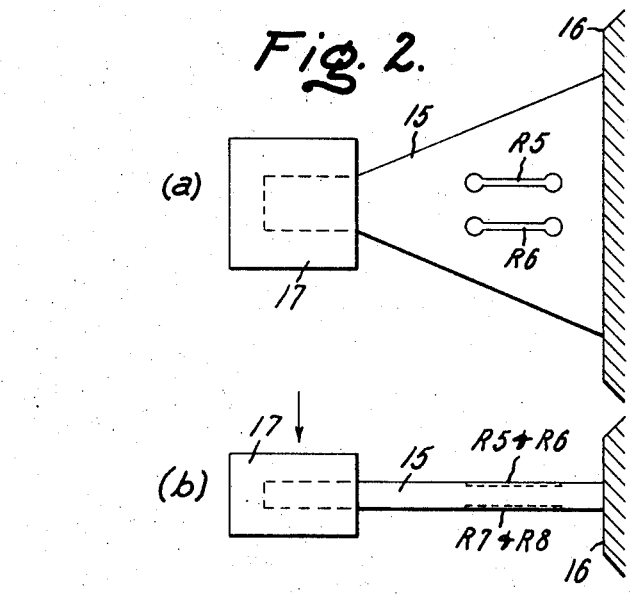

United States Patent Office 3,572,109
Patented Mar. 23, 1971

3,572,109
INTEGRAL SEMICONDUCTOR STRAIN GAGE
TRANSDUCERS WITH FREQUENCY OUTPUT
Alexander J. Yerman, Scotia, N.Y., assignor to
General Electric Company
Filed Aug. 9, 1968, Ser. No. 751,426
Int. Cl. G01b 7/20; G01p 15/08
U.S. Cl. 73—141
8 Claims

ABSTRACT OF THE DISCLOSURE

A precise instrument transducer having an analog frequency output as a function of applied force comprises two identical Wien bridge oscillators with integral single crystal semiconductor strain gages arranged to produce approximately equal and opposite resistance changes in the two oscillators so that the resulting frequency changes are additive. Applied as an accelerometer the gage pairs are on opposite sides of a cantilever beam, and as a load cell are oriented in different directions on (100) cut silicon where, together with the other circuit elements, they can be fabricated by integrated circuit techniques.

---

This invention relates to integral single crystal semiconductor strain gage transducers, and more particularly to force responsive integral silicon strain gage transducers having an analog frequency output. The silicon strain gages are employed as variable resistance elements in dual Wien bridge oscillators whose difference frequency is a function of the strain resulting from the applied force.

In highly precise instruments such as accelerometers for missile guidance systems, it is desirable to supply an output signal that can be integrated with good accuracy to obtain velocity or distance. However, accelerometers and other force responsive instruments including velocity meters and load cells commonly have an analog voltage output, and the difficulties of accurately integrating an analog voltage signal are well known. It is generally agreed that a frequency modulated or analog frequency output signal results in a more accurate instrument because integration of the signal can be accomplished with less degradation of signal accuracy.

Single crystal silicon with integral opposite conductivity type strain gage sensors can advantageously be used as force responsive transducers in these types of instruments. The piezoresistive effect, defined as the change in resistivity with applied stress, is especially pronounced in silicon and germanium and certain other semiconductors and results from the strain-induced modulation of the conduction mechanism of the semiconductor. Because of the large gage factors that consequently can be obtained, these semiconductors when oriented in predetermined crystallographic directions have been employed as strain gages for sensing various types of stresses. In addition to having large piezoresistive coefficients, another advantage of the semiconductor strain gage is that junction isolated gage elements of any desired shape can be formed at any selected location on an opposite conductivity type substrate using standard diffusion and epitaxial fabrication techniques, thereby eliminating the need for a bond between the gage elements and the substrate. Moreover, single crystal silicon with integral strain gage sensors is well adapted for use as the spring in various types of transducers because of the inherent mechanical stability and excellent elastic characteristics of single crystal silicon. Thus, it has desirable properties for use as a spring in a load cell for measuring compressive forces or as the spring in a moving mass type of accelerometer, including the aforementioned and its freedom from creep and hysteresis. This combination of properties permits the design of silicon spring bars with integral gage elements which are greatly superior to the metal spring with bonded strain gage elements now commonly employed in commercial load cells.

Accordingly, an object of the invention is to provide a new and improved force responsive integral single crystal semiconductor strain gage transducer having a frequency output.

Another object is the provision of an integral monocrystalline silicon strain gage transducer comprising dual Wien bridge oscillators whose difference frequency is indicative of the applied force, wherein the strain gage elements are the variable resistance elements in the Wien bridge circuits.

Yet another object is to provide precision force responsive instruments as for example accelerometers and load cells employing semiconductor strain gage transducers in dual Wien bridge oscillator circuit arrangements, having the capability of a highly linear output and of being fabricated by integrated circuit techniques.

In accordance with the invention, a semiconductor strain gage device with a frequency output comprises at least two pairs of semiconductor gages of one conductivity type formed integrally on an opposite conductivity type single crystal semiconductor substrate. The substrate and integral gages are mounted to be responsive to an applied force to produce a strain and resulting resistance change in each gage pair that is a function of the applied force, and the pairs of gages are oriented differently with respect to the substrate to produce different resistance changes. The pairs of gages are connected in dual Wien bridge oscillators as variable resistance elements for changing the frequency of oscillation of the two oscillators. Preferably the gage pairs are located and oriented to produce equal and opposite resistance changes, so that the frequency of one Wien bridge oscillator increases and the other decreases in response to an applied force. Means are further provided for producing an output frequency that is indicative of the sum of the frequency changes in the two oscillators.

In one embodiment, the device is an accelerometer and the substrate comprises a cantilever beam with the gage pairs on opposite surfaces to be strained respectively in tension and compression. In a load cell embodiment, the substrate is a rigid load column subject only to compression, and is a (100) cut of n-type single crystal silicon with the p-type gage pairs oriented in different crystallographic directions to have approximately equal and opposite gage factors. Means are provided to improve the output linearity, and the circuit elements including the strain gages themselves can be fabricated by integrated circuit techniques.

The foregoing and other objects, features, and advantages of the invention will be apparent from the following more particular description of several preferred embodiments of the invention, as illustrated in the accompanying drawings wherein:

FIG. 1 is a schematic circuit diagram of a force responsive instrument employing dual Wien bridge oscillators and having an output frequency that is a function of the applied force, it being understood that the variable resistors in each bridge circuit are silicon strain gages;

FIGS. 2a and 2b are respectively top and side views illustrating the physical arrangement of gages in a cantilever beam spring-mass type accelerometer;

Figure 3:
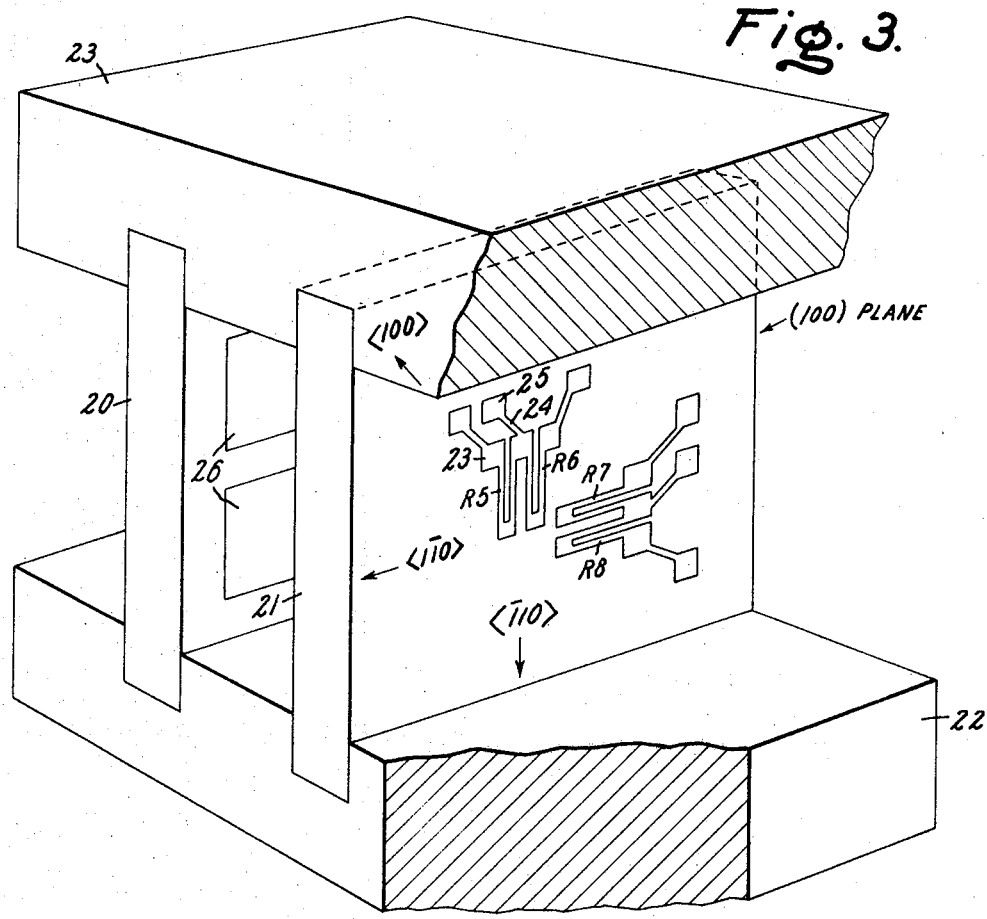
FIG. 3 is an isometric view of the physical apparatus of another embodiment of the invention functioning as a load cell.

In FIG. 1 is shown a pair of Wien bridge oscillators 11 and 12, each having its output connected to a mixer circuit 13. The first Wien bridge oscillator 11 generates an output frequency $f_1$ and the companion Wien bridge oscillator 12 generates an output frequency $f_2$, and the difference frequency $\Delta f$ is derived in the mixer circuit 13. The Wien bridge oscillator is a known conventional circuit and hence will be described only briefly. Two arms of the Wien bridge forming a portion of the oscillator 11 comprise two series connected resistors R1 and R2, and connected in parallel circuit relationship with this resistive branch is a reactive branch comprising in the third arm the series connected variable resistor R5 and capacitor C5, and in the fourth arm the parallel connected variable resistor R6 and capacitor C6. One junction of the resistive and reactive branches is connected to a common reference potential, such as ground potential, and the other junction of these two branches is connected to the output of a differential amplifier circuit 14 having a gain A. The junction of the resistors R1 and R2 in the resistive branch is coupled to the inverting input of the differential amplifier circuit 14 making it a negative feedback branch, while the junction of the third and fourth arms in the reactive branch is coupled to the non-inverting input of the amplifier making it a positive feedback branch. Oscillation occurs when the overall loop gain is $\geq 1$. Since the loop gain is the product of the differential amplifier gain A and the gain of the Wien bridge ($A_w$), it follows that the required amplifier gain is $$A \geq \frac{1}{A_w}$$

It can be shown that the maximum gain possible for the Wien bridge occurs when the frequency is $$f_n = \frac{1}{2\pi\sqrt{R5R6C5C6}}$$

or when $R5=R6=R$ and $C5=C6=C$, $$f_n = \frac{1}{2\pi RC}$$

Then if R2 is made small so that negative feedback is eliminated, $A_w = \frac{1}{3}$. At any other frequency, $A_w < \frac{1}{3}$ and in addition the output signal from the Wien bridge has a phase angle relative to the voltage applied to the bridge which is different from 0°. Thus under these conditions, a minimum amplifier gain of 3 would suffice to cause oscillation at $f_n$.

As the amount of negative feedback is increased by increasing the ratio of R2 to R1, the bridge gain is reduced and additional amplifier gain would be required. At the other extreme limit when $R2/(R1+R2) = \frac{1}{3}$, an infinite amplifier gain would be required. In general, since practical amplifiers have finite gain, $R2/(R1+R2) \leq \frac{1}{3}$, and the minimum required amplifier gain can be expressed as:

$$\frac{1}{A} = \frac{1}{2} - \frac{R2}{R1+R2} \qquad (1)$$

Figure 5:
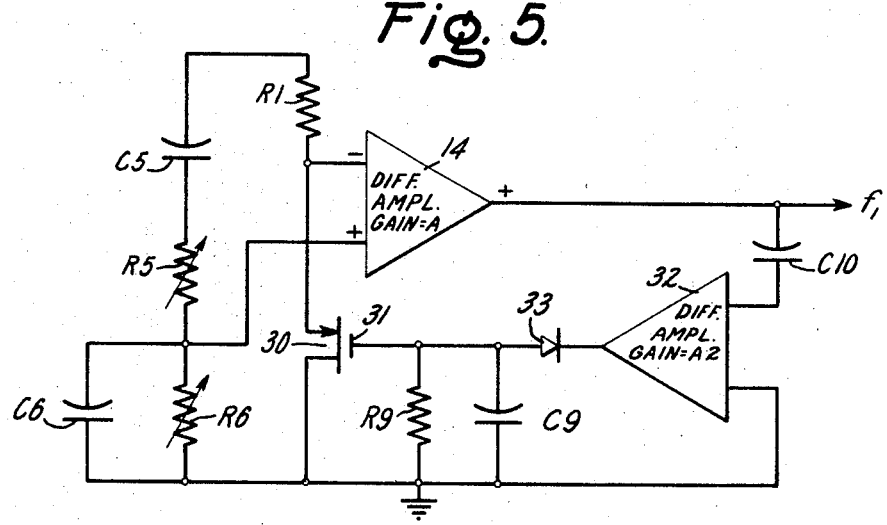
FIG. 5 is a schematic circuit diagram of an amplitude regulating circuit for a Wien bridge oscillator.

With ideal amplifier characteristics, viz, gain with negligible phase shift, frequency is determined solely by the values of the components in the reactive branch, and the minimum amplifier gain suffices to give an output frequency of $f_n$. Use of higher than the minimum gain would then require use of more negative feedback, i.e., a larger $R2/R1+R2$ ratio complying with the requirements of Equation 1. Generally, in a practical Wien bridge oscillator, adjustment of this ratio is made automatically in order to control the amplitude of the oscillations at some fixed level, and also to insure reliable startup of the oscillator. FIG. 5 shows a schematic diagram of a modification of an oscillator of the type shown in FIG. 1 that operates according to one method of accomplishing this.

In this circuit, a depletion mode field effect transistor 30 is employed in place of R2 in the resistive branch of the Wien bridge. This component has the characteristic of a low resistance when the voltage applied to gate 31 is zero and increased resistance as the voltage applied to the gate is increased in a negative direction. This voltage is derived from the amplitude of oscillator signal $f_1$ which is coupled through C10, amplified by differential amplifier 32 with a fixed gain of A2, and then rectified by diode 33 and used to charge capacitor C9 to some fixed value proportional to the oscillator signal amplitude. The time constant of R9 and C9 is adjusted so that it is long compared to the period of the oscillator frequency $f_1$.

With such an arrangement, at startup, the resistance of field effect transistor 30 is low, so that negative feedback is minimized. This gives a higher value of gain for the Wien bridge than is necessary to sustain oscillations and insures rapid startup. As the amplitude of the oscillation builds up, through the mechanism described, the resistance of field effect transistor 30 is gradually raised until its effective resistance satisfies the values of R2 required by Equation 1 for amplifier gain A. The amplitude control system then regulates output amplitude at a set level.

Figure 6:
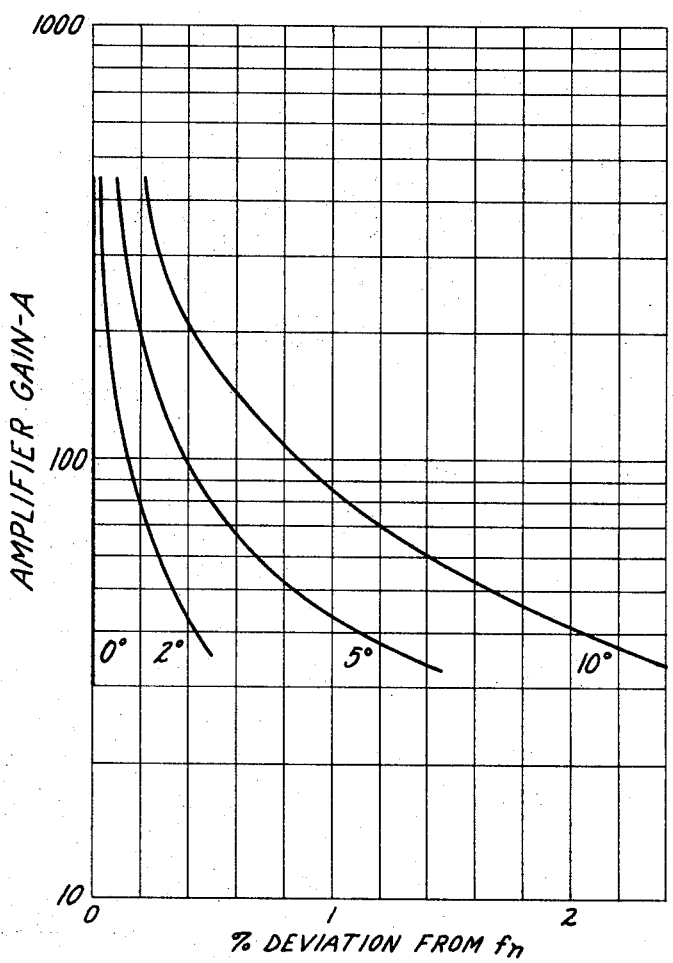
FIG. 6 is a series of curves relating amplifier gain and loop phase shift to deviation from the normal oscillator frequency, $f_n$.

In the case where the amplifier employed in the Wien bridge oscillator shows a finite phase shift $\theta$, oscillation will then occur at a frequency somewhat removed from $f_n$ in a direction to compensate for amplifier phase shift. This is undesirable since this shift in frequency is then subject to change as a function of phase shift or amplifier gain so that the stability of the oscillator frequency is reduced. In such a case, it can be shown that use of a maximum value of gain for a given loop phase shift $\theta$ is desirable since this will result in a minimum deviation from $f_n$. This situation is depicted in FIG. 6. In this figure, the abscissa shows the percent deviation from $f_n$ while the ordinate shows the amplifier gain required for any particular percent deviation. There values of loop phase shift are plotted as parameters. For example, FIG. 6 shows that with a loop phase shift of 5°, and amplifier gain of 100 would result in the oscillator operating at a frequency which differs by 0.4 percent from $f_n$. At a gain of 400, this difference would be reduced to 0.1 percent of $f_n$. A change in phase shift from 5° to 2° would result in an oscillator frequency change of (0.15–0.4) or $-0.25$ percent of $f_n$ for the former case versus (0.04–0.1) or $-0.06$ percent of $f_n$ in the latter case. This shows the desirability of high gain and low loop phase shift in the circuit in order to achieve good oscillator stability.

In a properly designed Wien bridge oscillator, the frequency of oscillation, as previously derived, is essentially $$f_n = \frac{1}{2\pi RC}$$

When the capacitor values are maintained constant, $f_n$ is then a single value function of the resistance R. As R5 and R6 decrease in resistance $f_n$ shows a corresponding increase in frequency. In accordance with the invention, resistors R5 and R6 are variable and are adjusted in coordination with another. Physically, the variable resistors R5 and R6 are provided by integral semiconductor strain gage elements, and the remainder of the components can be in discrete form, or as will be explained in detail later, can be fabricated as monolithic integrated circuits.

The circuit diagram for the companion oscillator circuit 12 of the dual Wien bridge oscillators is identical to that for the oscillator circuit 11, and preferably has the same component values. Thus, $R5=R6=R7=R8=R$, and $C5=C6=C7=C8=C$. Furthermore the differential amplifier 14' is identical to the differential amplifier 14 and has the same gain A. When the two sets of semiconductor strain gages R5, R6 and R7, R8 are matched, or suitable resistance trimming is employed to match the pairs, it is possible to match the output frequencies $f_1$ and $f_2$ of the two bridge oscillators 11 and 12 for the zero strain condition and obtain a zero value of $\Delta f$. The strain gage arrangement in the instrument is such that for an input strain one pair increases in resistance and the second pair decreases by an equal fractional amount, so that the frequency of one bridge oscillator will decrease while that of the second will increase a like amount. The difference frequency $\Delta f$ will then be equal to the sum of the two changes, and will be proportional to the input strain.

One illustratory physical arrangement of semiconductor strain gages suitable for use as an accelerometer is shown in FIG. 2. For simplicity, a constant stress cantilever beam spring-mass system is shown, although other spring-mass arrangements may be desirable for various reasons. A constant stress cantilever beam 15 is rigidly secured to a support 16 and has attached to its free end a mass 17, whereby the force exerted on the mass due to an acceleration causes the beam 15 to bend in proportion to the amount of applied force. The beam 15 is made of a single crystal semiconductor, and is preferably made of single crystal silicon in view of the inherent mechanical stability and excellent elastic properties of this semiconductor material. The strain gage elements R5 and R6 of the one Wien bridge oscillator circuit 11 are formed integrally on one surface of the beam 15, and the other pair of strain gage elements R7 and R8 of the second Wien bridge oscillator circuit 12 are in similar manner formed integrally on the opposite surface of the beam 15. The beam 15 conveniently is n-type silicon, and the strain gage elements R5 to R8 comprise elongated strips of p-type silicon. The gage elements can be formed on the beam 15 by standard diffusion or epitaxial techniques, and by reason of the existence of a p-n rectifying barrier between the opposite conductivity type gage elements and substrate, the current flow is constrained to the gage elements. By placing the pairs of strain gage elements on opposite sides of the beam 15, one pair will be in tension as the result of a particular applied force while the other pair is in compression. For instance, for the direction of applied force as shown in FIG. 2b, gage elements R5 and R6 are placed in tension while the other pair of gage elements R7 and R8 are placed in compression. By making all of the gage elements R5 to R8 of the same size and oriented in the same crystallographic direction, the change in resistance caused by the strain is equal in the four gage elements but opposite in sign in the two pairs. Consequently, one of the output frequencies $f_1$ and $f_2$ of the dual Wien bridge oscillator circuits 11 and 12 will increase, and the other will decrease by the same amount. Therefore, each of the Wien bridge oscillators makes approximately the same fractional contribution to the difference frequency $\Delta f$, and the output frequency change is doubled.

As has been mentioned, the cardinal advantage of the integral monocrystalline silicon strain gage transducer comprising the dual Wien bridge oscillators is that the output is a frequency which varies as function of the force being measured and thus can supply a signal that can be time integrated to obtain the desired quantity with good accuracy. An accelerometer of this type can be employed for example in a missile guidance system to obtain a highly precise value of velocity. There are several other particular advantages of the dual oscillator bridge arrangement for force responsive transducer applications. Temperature effects on the bridge components are compensated as long as both bridge oscillators are exposed to the same temperature. Since no inductors are involved, frequency stability is dependent only on the stability of the resistor and capacitor components in the two bridges. For the same reason, it is also possible to fabricate the circuit components other than the strain gage elements as monolithic integrated circuits. By using techniques known in the art, frequencies are adjustable in each bridge by means of resistance shunts or capacitor trimmers. It is also possible to accomplish range switching by switching in different capacitor values in the two bridge oscillators. Because of the push-pull nature of the output from the two bridge circuits, small non-linearities due to gage or spring characteristics are compensated. Finally, the bridge oscillator outputs are sinusoidal with low harmonic distortion. As will be pointed out with regard to the second embodiment of the invention shown in FIG. 3, the inherent non-linearity of the Wien bridge circuit can be reduced by using the semiconductor strain gages, and certain other benefits are derived from fabricating the other circuit components as monolithic integrated circuits.

The load cell instrument for measuring force or load shown in FIG. 3 comprises at least two rigid upstanding load columns 20 and 21, each secured at right angles at opposing edges between a base support 22 and a load distributor 23. The whole assembly is rigid, and a force or load acting on the exposed surface of the load distributor 23 compresses the load columns 20 and 21 by an amount proportional to the applied force. The two load columns 20 and 21 are preferably made of n-type single crystal silicon, and more particularly the monocrystalline silicon is a (100) crystallographic plane cut. The p-type silicon strain gage elements R5 to R8 in this embodiment are for convenience formed on one surface of one of the load columns, however if desired the two pairs of gages may be distributed on different surfaces of the load columns. In a load cell the substrate silicon for optimum results is best subjected only to compressive forces. Thus, it is necessary to orient the strain gage elements in different crystallographic directions in order to obtain both a positive and a negative change in resistance. This is in contrast to the situation for the cantilever beam 15 in which the two pairs of gage elements are respectively subjected to compressive and tensile stresses, to thereby produce opposite sign resistance changes in response to an input force, by reason of being located on opposing sides of the beam. In this embodiment the gages R5 and R6 are formed integrally on a selected surface of the load column 21 and comprise elongated strips of p-type silicon oriented longitudinally in the $<\bar{1}10>$ crystallographic direction. In order to increase the effective length of the gages, each gage comprises several elongated strips connected together and folded back upon one another in a spaced parallel arrangement. A contact pad 23 is located at each end of the individual gage elements, the contact pad between the two gages R5 and R6 being common. There is further connected to each contact pad 23 an integrally formed trimming resistor 24 in turn terminated by an additional contact pad 25. The elongated silicon trimming resistors 45 are oriented at 45° to the strain gage directions so as to be non-strain sensitive. The axial strain, however, appears to the gage pair R5, R6 as a longitudinal strain so that their response is related to their longitudinal gage factor which is defined as:

$$(GF)_L = \frac{\Delta R}{R\epsilon_L}$$

where $\Delta R/R$ is the fractional resistance change, and $\epsilon_L$ is the longitudinal strain. The longitudinal gage factor or longitudinal strain refers to the change in resistance when current and strain are collinearly related. The second gage pair R7, R8 is physically identical to the first gage pair but is oriented longitudinally at right angles to the first pair in the $<1\bar{1}0>$ direction. Both gage pairs are subjected to the same axial strain, but the axial strain appears to the gage pair R7, R8 as a transverse strain, i.e., the directions of the gage current and the applied strain are at right angles to one another. Their response is related to the transverse gage factor defined as:

$$(GF)_T = \frac{\Delta R}{R \epsilon_T}$$

where $\epsilon_T$ is the transverse strain. It is well known that in a crystal of semiconductor material such as silicon, both the longitudinal gage factor $(GF)_L$ and the transverse gage factor $(GF)_T$ vary as a function of direction in the crystal. This follows, of course, from the fact that the transverse and longitudinal piezoresistance coefficients are different for the different crystallographic axes of the crystal. The crystallographic plane and orientation selected in FIG. 3 are unique in that the values of $(GF)_L$ and $(GF)_T$ are approximately equal and opposite. Thus, any compressive load applied to the load column 21 results in an axially directed strain which decreases the resistance of gage pair R5, R6, and increases the resistance of gage pair R7, R8 by a corresponding amount. Consequently, when the two gage pairs are connected in the dual Wien bridge oscillator circuit arrangement shown in FIG. 1 an input strain will result in an increase of the frequency of one oscillator and a corresponding decrease in the frequency of the other oscillator. Thus the difference between the two oscillator frequency changes twice as much as the frequency change of either oscillator alone.

Figure 4:
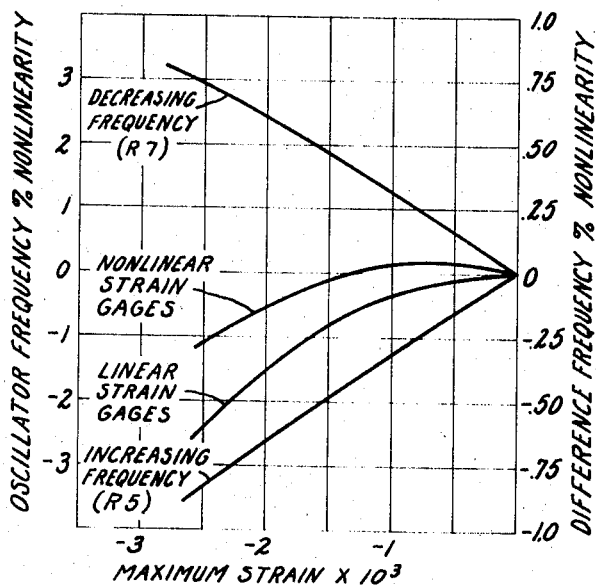
FIG. 4 is a series of curves of nonlinearity as a function of full scale strain level employed in the transducer, and are useful in explaining the improvement in linearity of output of the FIG. 3 embodiment due to employment of dual oscillators and particular strain gage types.

In addition to increasing the output frequency change obtained, an added advantage of using a pair of Wien bridge oscillators together with semiconductor strain gages with equal and opposite gage factors is an improvement in linearity. An analysis of the linearity of a dual Wien bridge oscillator circuit indicates that the inherent non-linearity of the circuit due to the $1/R$ frequency dependence is considerably reduced using an oscillator pair and is further reduced because of the characteristics of semiconductor strain gages which are themselves inherently somewhat non-linear. This can be better appreciated by considering the information presented in FIG. 4. FIG. 4 shows the relationship between non-linearity which is presented as a percentage of the full range change in frequency, and the maximum strain level reached at full range load. The upper and lower curves are related to the left-hand ordinate scale and illustrate the inherent non-linear behavior of each of the two Wien bridge oscillators alone. The upper curve would result for that oscillator containing strain gage elements R7 and R8 which are assumed to exhibit a linear response to a compressive strain. The lower curve would result for that oscillator containing strain gage elements R5 and R6 which are also assumed to have a linear response. In both instances, this non-linearity is caused by the fact that each oscillator frequency is reciprocally related to the strain element resistance R so that significant non-linearity results even though the strain sensitive resistance element is linear.

However, when the difference between the output frequencies of these two oscillators is taken, non-linearity is significantly reduced. This can be seen by observing the curve which is second from the bottom. This curve is referred to the right-hand ordinate scale and is based again on the use of linear strain gage elements in each Wien bridge oscillator. From this it can be seen that non-linearity is less than 0.1 percent for strain levels less than $1 \times 10^{-3}$ in./in. which represents an acceptable full range strain level in many instrument transducer designs. This improvement in non-linearity is solely due to the employment of two Wien bridge oscillators, one of which generates a positive frequency change and the other a negative frequency change.

The final curve in FIG. 4 illustrates that an additional reduction in non-linearity results if p-type silicon strain gages are employed in the two oscillators. Such strain gages are themselves inherently non-linear in a direction which tends to compensate for the inherent circuit non-linearity described above. The degree of compensation is related to the degree of non-linearity of the strain gage elements. The curve shown represents typical behavior of highly doped p-type silicon strain gages with a dopant concentration greater than about $1 \times 10^{20}$ atoms/cm.[3] It illustrates that strain gages of that type together with the circuit means previously described results in reduced non-linearity of the output difference frequency. The curve shown should be interpreted as typical behavior rather than optimum for all applications. An optimum for any specific transducer design would depend on the full range strain value selected, and could be obtained by suitable adjustment of the dopant concentration used to make the strain gage elements. Higher dopant concentrations reduce the degree of non-linearity.

As was mentioned previously, the dual Wien bridge oscillator circuit contains only resistors and capacitors, and no inductance elements, and the other components including the semiconductor strain gages are adapted to be manufactured as monolithic integrated circuits. This includes the two differential amplifiers 14 and 14' and the other components in the Wien bridges. These monolithic integrated circuits may be fabricated directly on the silicon load columns 20 or 21, i.e., formed integrally therewith, or can be manufactured as separate chips which are then mounted on a selected surface of one of the load columns. By way of illustration, the squares 26 in FIG. 3 represent two monolithic integrated circuits for the two Wien bridge oscillators and are shown on the column 20 although they could be formed integrally on either surface of the column 21 as well. In addition to the standard benefits of fabrication by integrated circuit techniques, there are other practical advantages which arise. It would be advantageous in an ideal amplifier to have such desirable amplifier properties as high gain, high input impedance, wide bandwidth, small phase shift, and low output impedance. The desirability of having higher gain, for instance, arises from the fact that as open loop gain is increased, the oscillator becomes less sensitive to interference from such error producing inputs as temperature and supply voltage. Due to the dual nature of the FIG. 1 circuit however, less stringent amplifier characteristics would be acceptable provided that the two amplifiers used closely track each other as temperature changes. In that event, changes in oscillator frequency due to non-ideal amplifier characteristics would be similar in the two oscillators and tend to cancel. Close tracking requires a close similarity in components and component locations in the two amplifiers and equal temperatures. The first requirement is met by using integrated circuit amplifiers because the manufacturing methods employed provide a close match in amplifier properties. The second requirement is best achieved by mounting both amplifiers in close proximity. Both requirements are best achieved by utilizing monolithic integrated circuit amplifiers which are formed integrally on the silicon substrate (load column 21) with the gage elements R5 to R8. A less desirable but still acceptable approach is to use integrated circuit amplifiers in chip form and mount them together near the gage locations.

Other fringe benefits which results from using monolithic integrated circuit amplifiers include the reduction of stray capacitance due to external wiring connections which makes it possible to obtain stable osillator operation at higher frequencies and results in increased measurement resolution. Additionally, the small size of the entire circuit when packaged into integrated circuit form makes temperature control feasible with very low power expenditure and small weight increase. Temperature control can very readily be implemented by providing additional resistance elements on the same silicon substrate for use as heaters and temperature sensors, and an additional integrated circuit amplifier for closed loop temperature control of the substrate temperature.

Other modifications of the FIG. 3 embodiment can be suggested. For example, the load cell configuration could be fabricated on a single monolithic block of silicon rather than two load columns as shown, where higher load capacity is desired. Also, the distribution of gages and integrated circuits on multicolumn cells can be varied from that illustrated to include combinations where any one column includes only the strain gage elements and circuit components associated with one of the Wien bridge oscillators so that electrical isolation between the two oscillators is improved. Moreover, other transducer types such as pressure transducers could be designed to employ the basic concepts advanced here.

In summary, a precise transducer is provided having a varying frequency output as a function of the applied force that can if desired be time-integrated to obtain the desired quantity. The pairs of integral monocrystalline semiconductor strain gages in the dual Wien bridge oscillators are physically arranged in different ways depending on the nature of the instrument to produce approximately equal and opposite resistance changes, so that the resulting frequency changes in the oscillators are additive. As a result, the output is increased and is highly linear, and by means of a second order modification of the gage characteristics, the linearity can be further improved. As a supplementary feature, the other circuit components can advantageously be fabricated by integrated circuit techniques.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters Patent of the United States is:

1. A semiconductor strain gage device with a frequency output comprising at least two pairs of semiconductor strain gages of one conductivity type formed integrally on at least one opposite conductivity type single crystal semiconductor substrate which is responsive to an applied force to produce a strain and resulting resistance change in each gage pair that is a function of the applied force, said pairs of gages being oriented differently with respect to the substrate to produce different resistance changes, dual Wien bridge oscillators, said pairs of strain gages being connected respectively as variable resistance elements in the two oscillators for changing the frequency of oscillation of the respective oscillators, and means for producing an output frequency that is indicative of the sum of the frequency changes in the dual oscillators.

2. A device as defined in claim 1 wherein said pairs of strain gages are oriented on said substrate to produce approximately equal and opposite resistance changes, whereby the frequency of one Wein bridge oscillator increases and the frequency of the other Wien bridge oscillator decreases in response to the applied force.

3. A device as defined in claim 1 wherein said Wien bridge oscillators, including said pairs of strain gages, are fabricated as monolithic integrated circuits.

4. A semiconductor strain gage device with a frequency output comprising two pairs of substantially identical p-type silicon strain gages formed integrally on at least one single crystal n-type silicon substrate, means for mounting said substrate and integral strain gages to be responsive to an applied force to produce a strain and resulting resistance change in each gage pair that is a function of the applied force, said pairs of gages being oriented differently with respect to the substrate to produce approximately the same magnitude of resistance change but opposite in sign, dual Wien bridge oscillators each including a reactive branch, said pairs of strain gages being connected respectively in the reactive branches of the two oscillators as variable resistance elements for changing the frequency of oscillation of the respective oscillators, whereby the applied force results in a strain which causes the frequency of one Wien bridge oscillator to increase and the frequency of the other Wien bridge oscillator to decrease, and means for producing an output frequency that is the sum of the frequency changes in the dual oscillators.

5. A device as defined in claim 4 wherein said silicon substrate comprises a cantilever beam which bends in response to the applied force, and one of said pairs of gages is formed integrally on one surface of said beam while the other gage pair is formed integrally on an opposite surface of said beam, and all of said gages comprise elongated strips of p-type silicon oriented longitudinally in the same crystallographic direction, whereby one pair is subjected to tensile forces and the other pair is subjected to compressive forces.

6. A device as defined in claim 4 wherein said substrate is a (100) plane of single crystal silicon in the form of a rigid load column which is compressed by the applied force and produces only an axially directed strain, and said pairs of gages are oriented approximately at right angles to one another in crystallographic directions such that the gage factors of the respective gage pairs are approximately equal and opposite, whereby the axially directed strain causes the resistance of one gage pair to increase and the resistance of the other gage pair to decrease.

7. A device as defined in claim 6 wherein said strain gages have non-linear characteristics selected to give an over-all improvement in output frequency linearity.

8. A device as defined in claim 4 wherein said substrate is a (100) plane of single crystal silicon in the form of a rigid load column which is compressed by the applied force and results in an axially directed strain, and said pairs of gages comprise elongated strips of p-type silicon oriented longitudinally in alignment with said axially directed strain and approximately at right angles thereto along crystallographic directions such that one gage pair is subjected to a longitudinal strain and the other pair is subjected to a transverse strain and the gage factors of the respective gage pairs are approximately equal and opposite, whereby the axially directed strain causes the resistance of one gage pair to increase and the resistance of the other gage pair to decrease.

References Cited

UNITED STATES PATENTS 3,350,944  11/1967  Michele _____ 317—235(26)
3,474,681  10/1969  Eriksen _____ 73—88.5SD JAMES J. GILL, Primary Examiner U.S. Cl. X.R.

73—88.5, 517; 317—235